Aug. 9, 1932.  F. W. GAY  1,870,287

ALTERNATING CURRENT MACHINE AND STARTING MEANS THEREFOR

Filed Jan. 29, 1930  2 Sheets-Sheet 1

INVENTOR.
Frazer W. Gay
BY
George D. Richards
ATTORNEY.

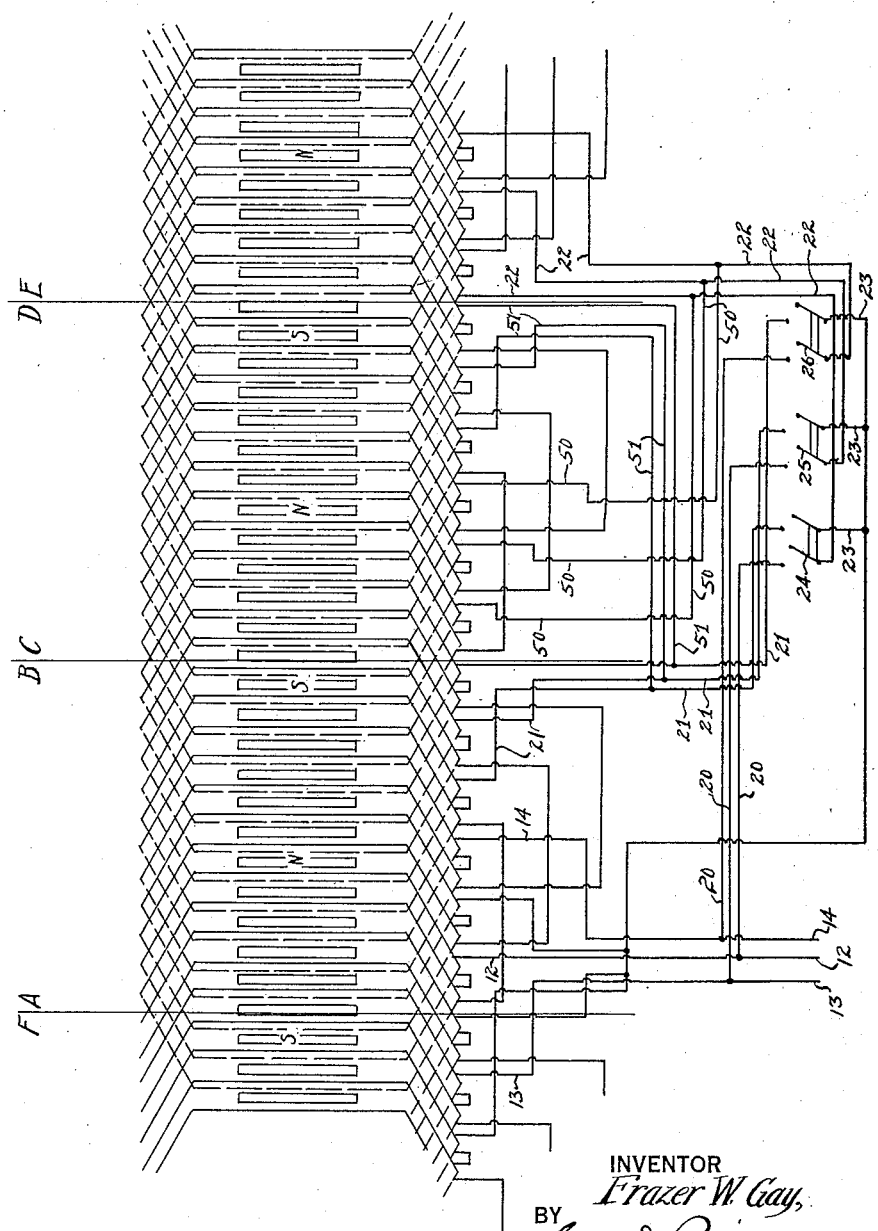

Patented Aug. 9, 1932

1,870,287

UNITED STATES PATENT OFFICE

FRAZER W. GAY, OF NEWARK, NEW JERSEY

ALTERNATING CURRENT MACHINE AND STARTING MEANS THEREFOR

Application filed January 29, 1930. Serial No. 424,191.

This invention relates, generally, to the starting of alternating current machines, and the invention has reference, more particularly, to means for starting alternating current motors of large size and especially such motors as may conveniently be adapted to have their stator windings divided into three parallel windings for normal operation.

The means heretofore commonly provided for starting large alternating current motors either cause an excessive drain of K. V. A. from the supply line during the starting operation, or else employ expensive, complicated and sometimes unreliable auxiliary starting equipment. Also, such starting means as commonly employed, require a series of consecutive high speed operations in a proper sequence to effect the starting of a machine. The starting operation is discontinuous in that it requires a switch to be consecutively closed and then opened with consequent violent interruption of the current flow followed by a great inrush of current.

The principal object of the present invention is to provide a novel means for starting large alternating current motors, synchronous condensers, frequency changer sets and in general alternating current machines having at least six poles, said starting means being adapted to inherently provide the proper starting voltages for said machines, whereby the starting operation is performed smoothly and without the necessity of going through a series of high speed operations.

Another object of the present invention is to provide a novel starting means of the above character which is of extremely simple construction and which employs merely the machine winding and inexpensive auxiliary switches for effecting the starting of the machine.

Still another object of the present invention lies in the provision of a starting means of the above character which is easily operated to effect the starting of a machine, the starting action taking place without sudden or violent current interruptions.

A further object of the present invention is to provide a starting means of the above character which merely requires the closing of switches to complete the starting operation, such switches being closed without the subsequent occurrence of high voltage or current surges.

Still another object of the present invention is to provide a starting means of the above character which operates to produce a machine starting torque which is continuous through the starting period.

A further object of the present invention lies in the provision of a starting means employing a series and then parallel arrangement during the starting operation and in which each phase winding is continuous, having a minimum number of wires tapped thereto and brought out of the machine to effect the parallel arrangement.

In carrying out the invention in its preferred form, each phase winding of the electrical machine is wound in three winding groups of equal numbers of turns, each such winding group being preferably distributed circumferentially over one third of the stator, although such exact distribution of the winding groups is not imperative especially in machines having many poles. The three stator winding groups of each phase are so connected in series that with full field on the machine, the counter E. M. F. generated by one winding group is one hundred and eighty degrees out of time phase with respect to the counter E. M. F.'s generated by the remaining two groups in that phase.

It is evident that the winding group of each phase winding which is one hundred and eighty degrees out of time phase with the remaining two groups of the phase winding is a bucking winding. It is desirable that the several bucking winding groups of the several phase windings be positioned adjacent each other, i. e. such bucking winding groups are arranged so as to constitute one bucking three phase group or in any case several such bucking three phase groups.

Other objects of this invention, not at this time more particularly enumerated, will be clearly understood from the following detailed description of the same.

The invention is clearly illustrated in the accompanying drawings, in which:—

Fig. 3 is a schematic view of a developed winding illustrating the machine of the present invention.

Similar characters of reference are employed in the above described views to indicate corresponding parts.

Figure 1:
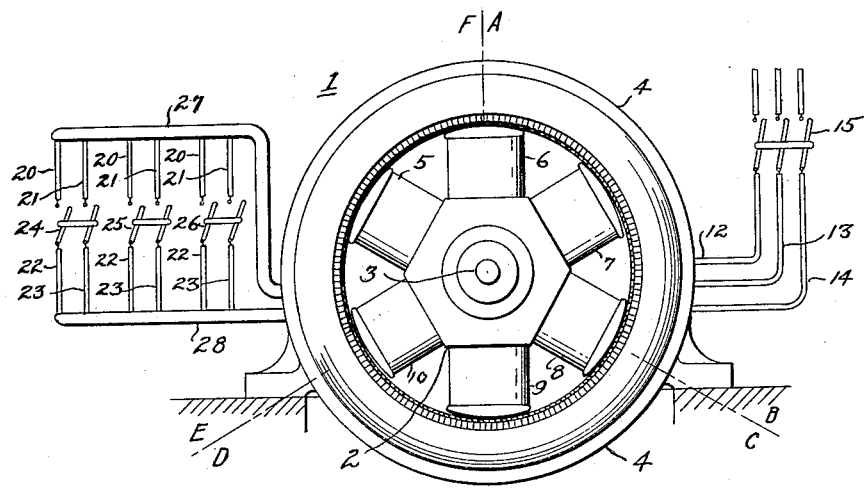
Fig. 1 is a view in end elevation of a six pole alternating current machine provided with the starting means of this invention.

Referring now to the said drawings, the reference numeral 1 designates a six pole A. C. electrical machine provided with the starting means of this invention, said machine having a stator 4 and a rotor 2 mounted on a shaft 3. Rotor 2 is illustrated as having six field poles 5, 6, 7, 8, 9 and 10 accommodating field winding 11 although it is to be understood that the novel starting means of the present invention is equally applicable to machines having a greater number of poles. The three phase winding of stator 4 is connected by leads 12, 13 and 14 through a three pole switch 15 to a suitable source of A. C.

Figure 2:
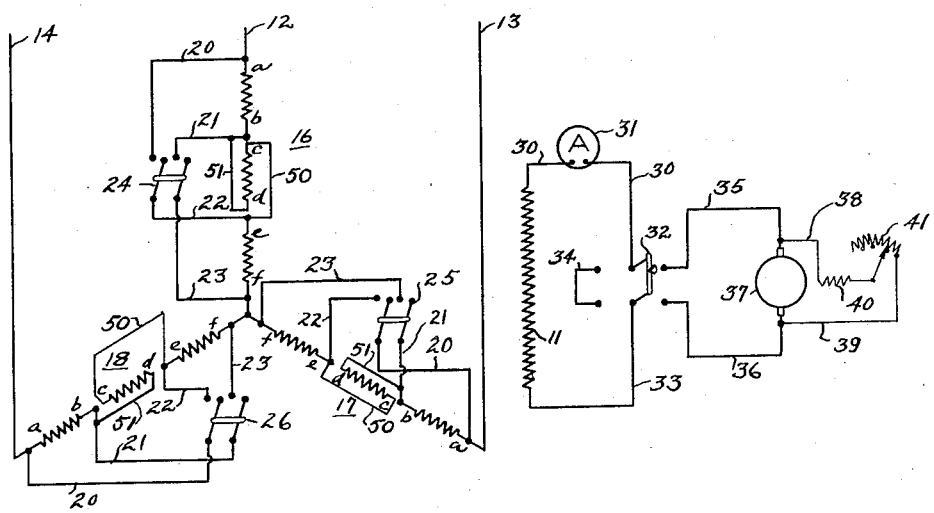
Fig. 2 is a wiring diagram of the machine of Fig. 1 together with its exciter.

The three phase windings of stator 4 are designated 16, 17 and 18 as shown in Fig. 2 of the drawings and are shown star connected, but these windings may be delta connected if desired. Each of these phase windings is wound with three winding groups and as the respective winding groups of the phase windings are similar, they are similarly designated $ab$, $cd$ and $ef$ for each of the phase windings. One of the winding groups of each phase winding, for example, winding group $cd$ is so connected by leads 50 and 51 to its adjoining winding groups $ab$ and $ef$ as to generate a counter E. M. F. which is one hundred and eighty degrees displaced from or directly out of phase with the counter E. M. F. generated by winding groups $ab$ and $ef$, thereby causing winding group $cd$ of each phase winding to buck the remaining winding groups. The bucking winding groups $cd$ of the several phase windings are arranged together so as to be distributed circumferentially over one third of the stator 4, thereby forming a bucking three phase group. Thus in Fig. 1 this three phase bucking winding group may be considered as confined between points CD of stator 4, whereas the phase winding groups $ab$ and $ef$ of the three phase windings are respectively confined circumferentially between points AB and EF of the stator 4. The AB group of coils comprising one winding group $ab$ of each phase may for convenience be considered as constituting a three phase winding on the section of stator 4 extending between points A and B. Likewise, the CD and EF groups of coils respectively, constitute in effect respective three phase windings.

Similar leads are tapped to corresponding points of each of the phase windings 16, 17 and 18 and extend exteriorly of the machine 1. Thus leads 20 and 23 are tapped to the ends of the phase windings while leads 21 and 22 are tapped to the junction points of the winding groups of these phase windings. Leads 20 and 21 tapped to winding 16 connect with one side of a double pole switch 24, whereas leads 22 and 23 tapped to this winding connect with the other side of switch 24. Likewise the leads associated with phase winding 17 connect with a switch 25 and those associated with phase winding 18 connect with a switch 26. Although three double pole switches are illustrated in the drawings, it is to be understood that either six single pole stick operated switches or a six pole gang switch may be used in lieu thereof, if desired, or even a six pole oil circuit breaker may be used. Leads 20 and 21 may be contained within a cable 27 and leads 22 and 23 within a cable 28 as illustrated in Fig. 1.

One end of field winding 11 is connected by a lead 30 through an ammeter 31 to one pole of a double pole, double throw switch 32. The other end of field winding 16 is connected by a lead 33 to the other pole of switch 32. When switch 32 is thrown to the left, as viewed in Fig. 2, a lead 34 completes a short circuit for field winding 11, and when switch 32 is thrown to the right, a pair of leads 35 and 36 complete a circuit between field winding 11 and the exciter armature 37. Leads 38 and 39 connect the exciter field 40 through a rheostat 41 to opposite sides of armature 37.

In operation, the switches 24, 25 and 26 are left open at the starting of the machine 1 so that the three winding groups $ab$, $cd$ and $ef$ of each phase are connected in series with one another. Switch 32 is thrown to the left as viewed in Fig. 2 so that lead 34 short circuits field winding 11.

It will be obvious to one skilled in the art that at starting the three winding groups of each phase winding, i. e. $ab$, $cd$ and $ef$ will function substantially the same as three reactances in series, each absorbing substantially the same percentage of the line voltage and each contributing substantially the same amount of energy to the rotor loss. Hence each said winding will make substantially the same contribution to the starting torque of the motor the same as if these three windings were consecutively connected in the standard way.

Since the CD three phase winding is interlaced with windings AB and EF at its ends and being connected in reverse, the current in the CD winding will be in opposition to those of the windings AB and EF and where the CD winding is interlaced with windings EF aid AB, the currents will neutralize each other so that no flux is established at these points indicated as BC and DE in Fig. 1.

The extent of these dead points may be reduced to substantially two thirds of a pole by using a short slot pitch. It is to be noted that the reactance of the windings at the dead points will also be very low, resulting in an increased current flow and a consequent increase in torque serving to compensate for the loss of torque at the dead points.

It will be evident that this system of starting increases the number of turns connected in series in starting three times, and hence the line current taken by the machine in starting is the same as that obtaining if the winding groups ab, cd and ef were connected in parallel and thrown across one-third voltage as by connecting to the one-third voltage tap of a starting compensator.

When the rotor 2 has come up to full speed or substantially full speed, the double pole, double throw switch 32 is thrown to the right as viewed in Fig. 2, thereby removing the short circuit from the field winding 11 and connecting this winding to the exciter armature 37. Exciter field rheostat 41 is then adjusted to raise the exciter voltage until winding 11 is drawing full no load field current indicated by ammeter 31. The three phase winding groups AB and EF generate counter E. M. F.'s of the same time phase and consequently the counter E. M. F.'s of these groups are arithmetically additive, whereas the counter E. M. F. of the CD three phase winding group is displaced 180 electrical degrees from the counter E. M. F.'s of winding groups AB and EF causing the generated counter E. M. F. of group CD to be subtracted from that of the others, thereby leaving the sum of the voltages as connected equal in value to the voltage of any one group, said resultant voltage having a time phase the same as that of the majority groups AB and EF.

Since the three phase winding groups AB, CD and EF always generate counter E. M. F.'s. having a definite time phase relation with respect to each other, it will be apparent to one skilled in the art that the phase rotation of all groups will be the same with the winding groups in series as during starting.

Each of the three phase winding groups AB, CD and EF will then generate 100% counter E. M. F., though the phase voltage of winding CD will be displaced 180 degrees with respect to the phase voltage of winding groups AB and EF. It is thus evident that with the motor currents passing through all the winding groups of each phase in series, the current in windings AB and EF is urging the motor forward while the current in winding CD causes the winding to act as a generator winding, thereby retarding the rotor as a result of the polarity forced upon the field winding 11 by the direct current from the exciter armature 37.

The net motoring effect is therefore that of only one positive driving winding, the effect of the other positive driving winding being counteracted by the negative winding CD. A study of Fig. 2 will show that since the voltage generated by the ab winding group is equal to and directly opposed by the voltage generated by winding group cd, machine terminal 12 and alternate junction point de will be at the same potential and may be connected by one pole of switch 24. Likewise since the voltage generated in winding group ef is equal to and directly opposed by the voltage generated in winding group cd the neutral point of the machine may be connected to the alternate junction point bc as by the other pole of switch 24. Similar connections may be made by switches 25 and 26. It is obvious therefore that if the direction of flow of current in winding CD can be reversed, then this winding will be a motoring winding and all windings will cooperate equally to drive the machine.

With machine 1 up to speed and its field current adjusted to normal no load value, the three phase winding CD is changed to a motoring winding by closing switches 24, 25 and 26. These switches serve to connect the several winding groups of each phase winding in multiple. These switches are similar to those disclosed in my applications Serial Nos. 334,539 and 405,935. Since the points a at the outer ends of the phase windings are of the same potential as the points d at the alternate junction points of these windings, counting from the outer ends of the windings, and as the points f at the inner ends of the phase windings are of the same potential as the alternate junction points b of these windings, counting from the inner ends of the windings before as well as after the switches 24, 25 and 26 are closed, the closing of these switches does not result in any voltage or current surge or cause arcing at the switch contacts.

The closing of switches 24, 25 and 26 causes a reversal of the direction of current flow in winding groups cd, thereby causing the three phase winding CD comprising three groups to act as a motoring winding so that all windings AB, CD and EF act together during the normal running of the machine.

It will be apparent that the starting means of the present invention may be applied to single phase machines as well as these phase machines or to machines having more than three phases. It will be apparent that each of the phase windings may have three or a larger odd number of winding groups and in which the even numbered groups are connected in reverse with respect to the remaining winding groups. It is merely necessary that the phase windings have an odd number of winding groups so that parallel connection of the winding groups may be obtained by connecting each end of a phase winding with alternate junction points of the winding groups counting from the respective end of the phase winding.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. In combination, an alternating current machine comprising, a phase winding having an odd number of winding groups, the alternate winding groups of said phase winding being connected so as to produce a counter E. M. F. of a polarity that is opposite to that produced by the remaining winding groups, means for connecting said phase winding to a source of power and additional means for connecting each end of said phase winding to alternate junction points of said winding groups counting from the respective ends of said phase winding.

2. In combination, an alternating current machine comprising, a stator having a plurality of phase windings, each of said phase windings having three winding groups connected in series and arranged so that the counter E. M. F. generated by the centrally positioned winding group directly opposes the counter E. M. F. generated by the remaining two winding groups, means for connecting said phase windings to a source of power, and means for connecting the end points of each of said phase windings with alternate junction points of the winding groups of said respective phase windings.

3. In combination, an alternating current motor, comprising a stator having a phase winding, said phase winding having three winding groups solidly and permanently connected together in series, leads tapped to the ends of said phase winding and additional leads tapped to the junction points of said winding groups, said leads extending exteriorly of said phase winding, and switching means connected to said leads and arranged upon closing to connect said three winding groups in multiple with the counter E. M. F.'s. of said three winding groups in the same time phase.

4. In combination with an alternating current machine comprising a phase winding having three winding groups solidly and permanently connected in series, of switching means connected thereto and arranged upon closing to place said three winding groups in multiple with their respective E. M. F.'s. in the same time phase.

5. In combination with an alternating current machine comprising phase windings having an odd number of winding groups solidly and permanently connected in series, of switching means comprising two switch poles per phase connected to said phase windings for connecting the winding groups of each phase in multiple with their respective E. M. F.'s. in the same time phase.

6. In combination with an alternating current machine comprising a stator having phase windings divided into three winding groups, leads connecting these three winding groups permanently in series, the intermediate winding groups of said phase windings being arranged consecutively around said stator with the respective end winding groups of said phase windings similarly arranged consecutively around said stator and terminating adjacent the ends of said intermediate winding groups, and means for connecting the winding groups of each phase winding in parallel with their respective E. M. F.'s. in the same time phase.

7. In combination, an alternating current machine comprising, phase windings, each of said phase windings having an odd number of winding groups, conductors connecting said winding groups of each phase winding solidly in series, said conductors serving to connect alternate winding groups in the reverse order to the remaining winding groups, and switching means connected to said phase windings for connecting the winding groups of each phase winding in multiple.

8. In combination, an alternating current machine comprising, phase windings, each of said phase windings having an odd number of winding groups, conductors connecting said winding groups of each phase winding solidly in series, said conductors serving to connect alternate winding groups in the reverse order to the remaining winding groups, and switches connected to each phase winding for connecting the ends of said respective phase winding to the alternate conductors interconnecting the winding groups of said respective phase winding.

In testimony, that I claim the invention set forth above I have hereunto set my hand this 28th day of January, 1930.

FRAZER W. GAY.